May 19, 1925.
R. POTH
DEVICE FOR SEPARATING WATER FROM COMPRESSED AIR IN MOTION
Filed Jan. 7, 1921  2 Sheets-Sheet 1
1,538,652
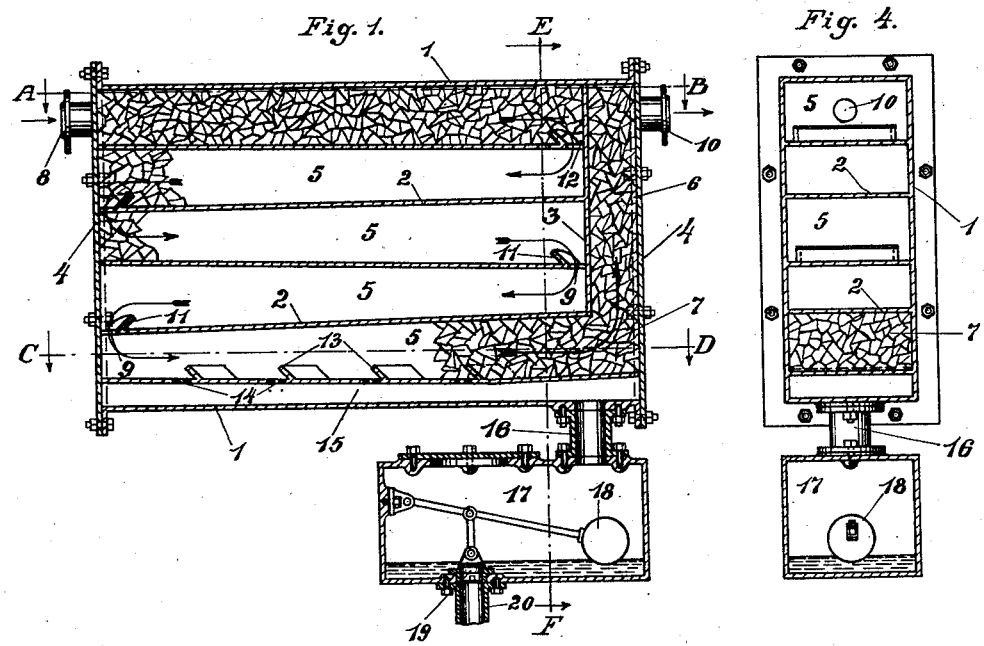
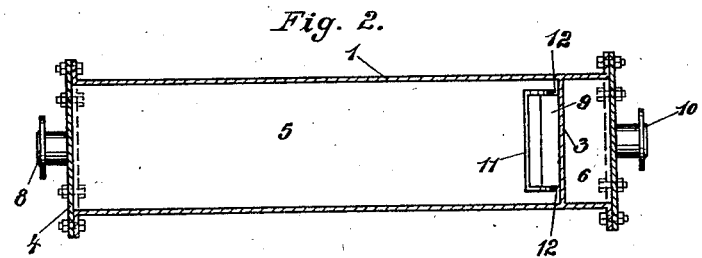
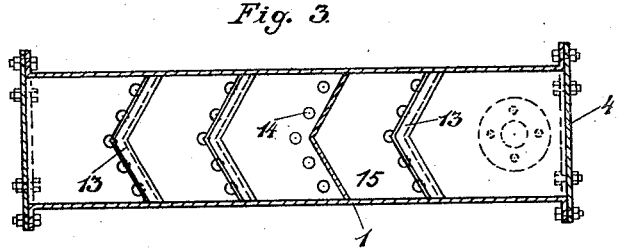
Witnesses:
Charles A. Mathé
Daniel Mathé
Inventor:
Richard Poth
By John Lotka
Attorney May 19, 1925.

R. POTH 1,538,652

DEVICE FOR SEPARATING WATER FROM COMPRESSED AIR IN MOTION

Filed Jan. 7, 1921 2 Sheets-Sheet 2

Witnesses:
Charles A. Mathé
Daniel Mathé

Inventor:
Richard Poth
By John Lotka
Attorney.

Patented May 19, 1925.

1,538,652

UNITED STATES PATENT OFFICE.

RICHARD POTH, OF DORTMUND, GERMANY.

DEVICE FOR SEPARATING WATER FROM COMPRESSED AIR IN MOTION.

Application filed January 7, 1921. Serial No. 435,773.

*To all whom it may concern:*

Be it known that I, RICHARD POTH, a citizen of Germany, and a resident of Dortmund in Westphalia, in the Republic of Prussia, Germany, merchant, have invented certain new and useful Improvements in Devices for Separating Water from Compressed Air in Motion (for which I have filed applications in Germany, December 22, 1913, Patent No. 284,011; Germany, August 13, 1918, Patent No. 312,274; England, July 10, 1920, Patent No. 148,907; England, July 10, 1920, Patent No. 148,908; Holland, September 3, 1920; Austria, January 7, 1921; Belgium, January 25, 1921; France, January 27, 1921, Patent No. 530,237), of which the following is a specification.

My present invention relates to a device by means of which compressed-air in motion is completely freed of the water mechanically carried along with it. This is accomplished by providing very numerous rough surfaces of resistance and compelling the compressed-air to come into touch with them by impact or by a compulsory contact and thus render up its moisture. To this end a suitable receptacle or casing is provided and in accordance with this invention subdivided into a plurality of separation-chambers by means of partition-walls and slanting bottoms. In each of these chambers a packing of sharp-edged, non-porous and rough-faced material, preferably fractured or broken quartz, of practically uniformly sized pieces is arranged. The compressed-air passing under its own high pressure through the numerous interstices thus created finds ample opportunities to transfer its moisture to the rough surfaces of this quartz-packing. The moisture adhering to these rough surfaces of the fractured quartz will, of course, gradually form water-drops which in due time will find their way to the slanting bottoms of said separation-chambers, whence the body of water resulting therefrom will pass into a collecting-chamber out of which it will be finally automatically transferred to the open air or elsewhere.

In the accompanying drawings:

Figure 1 is a longitudinal sectional view of the device embodying my present invention.

Figure 2 is a horizontal sectional view taken on line A—B of Figure 1, and

Figure 3 is a sectional view similar Figure 2 and taken on line C—D of Figure 1; whereas Figure 4 is a cross-sectional view taken on line E—F of Figure 1.

Figure 5:
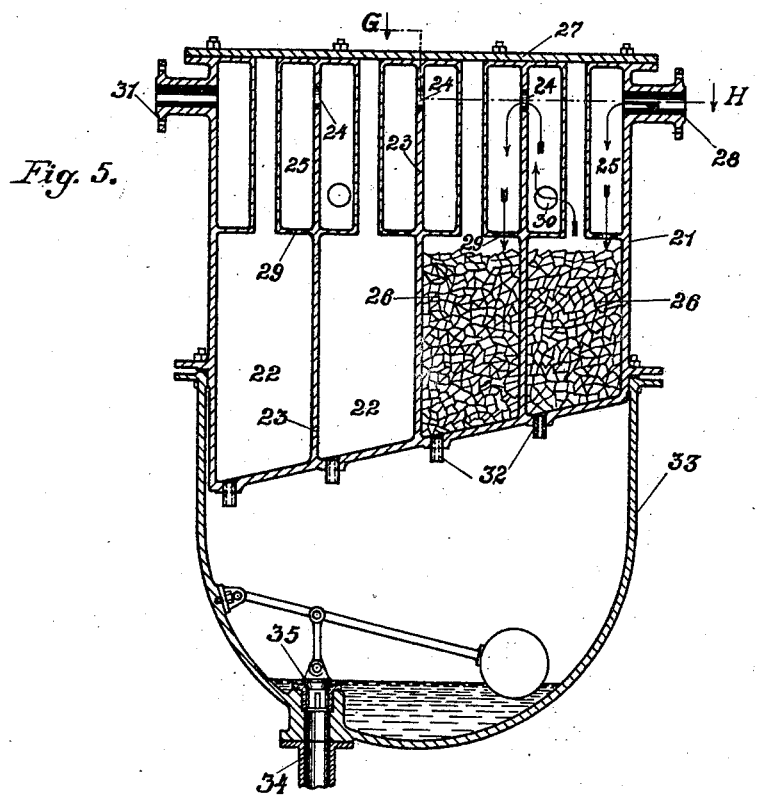
Figure 5 is a longitudinal sectional view of a modification of my invention.

The device according to Figures 1 to 4 inclusive substantially consists of a casing 1 provided with a plurality of apertured slanting partition-walls 2, arranged approximately horizontally, and with a vertical partition-wall 3. The ends of said casing are closed by means of covers 4 secured in any suitable manner to the flanged ends of said casing, whereby the horizontal separation-chambers 5 and the vertical separation-chamber 6 are completed and may be opened and closed when desired.

The operation of this device is as follows:—

After the separation-chambers 5 arranged in series, and the vertical chamber 6 forming an extension of the lowest chamber 5, have been filled with a packing 7 of fractured or broken quartz (for the sake of clearness, portions of this packing have been omitted from Figs. 1 and 4) the covers 4 are put into place and secured to said casing, whereupon the device is connected to the compressed air-main (not shown) by the aid of an inlet-pipe 8. The moist compressed-air now flows into the first or terminal chamber 5, passes through the interstices formed by the numerous pieces of fractured quartz and leaves this chamber to enter the next lower chamber by way of an aperture or slot 9 of the topmost slanting partition-wall 2, which by reason of the nature of this device simultaneously performs the duty of a slanting bottom of said terminal chamber. After flowing through the second highest chamber 5 from right to left, as indicated by arrows, the compressed-air passes through an aperture or slot 9 of the second partition-wall 2 into the third chamber 5 and so on, until it reaches the lowest separation-chamber, whence it ascends into the vertical chamber 6 forming the second terminal chamber of said series of chambers. From this terminal chamber the compressed-air, now completely freed from any traces of the moisture or water it contained on entering said casing, passes through an outlet-pipe 10 into the conduit (not shown) leading to the machine or tool to be driven by the dry compressed-air.

The compressed-air is thus compelled to pass the whole series of chambers 5 in succession, whereby the moisture carried by it is retained by the rough surfaces of the fractured or broken quartz and after it has been transformed into drops of water it will find its way by gravity to the several partition-walls or slanting bottoms 2. Now, since each of these partition-walls or bottoms is inclined the water collecting thereon will flow to the lowest point thereof and drop through the aperture or slot 9 arranged thereon to the next lower partition-wall. The inclination of these partition-walls for very obvious reasons alternates regularly so that the water will pursue its downward course until it reaches the slanting bottom of the lowest chamber 5. To prevent the quartz-packing 7 from partially sliding into the slots 9 and thus obstructing their free area more or less, each slot is partly fenced in by a guard 11, which not only aids the components of the packings 7 in bridging these slots but also provides two narrow passages 12 adapted to admit the water collecting at these points at all times to said slots 9. The water formed in the various chambers 5 will finally reach the lowest partition-wall or slanting bottom 2, differing in this respect from the others, in that it is provided with a plurality of angularly disposed guards 13 adapted to retain the accumulating water and aid it in passing through the apertures 14 arranged just in front of them, Figure 3. The water passing through these apertures enters a collecting-chamber 15 connected by a pipe 16 with a float-chamber 17, wherein a float 18 is arranged and adapted to operate a valve 19 in such a manner that when the water in said chamber 17 has reached a certain depth the buoyancy of the float will be sufficient to raise the valve 19 from its seat and thus permit some of the water standing under the pressure of the compressed-air to leave the chamber 17 through the aperture thus uncovered. The water will continue to flow through this aperture until the buoyancy of the float has diminished sufficiently to permit of the valve 19 being closed again, when of course, the water will cease to flow-off through the pipe 20 into the open air or to any desirable point or place. The discharge of water from the chamber 17 will from time to time be repeated, i. e. as often as the conditions for opening the valve are fulfilled. It is, of course, possible to combine the chambers 15 and 17 so as to form a single chamber, if so desired. For the same reason the float 18 may be replaced by any other suitable selfacting means as in doing so the flooding of the device would be prevented as effectively in the one case as in the other.

Numerous and carefully conducted experiments have shown that the best results are obtainable with a packing of fractured quartz since only by the aid of this material a complete separation of the water from compressed-air in motion can be obtained. The choice of the material for attaining the end in view is therefore of considerable importance. These experiments have also shown that porous substances are not suitable for separating the water from compressed-air in motion. Coke for instance does not by far give the same results as fractured quartz, since the compressed-air simply passes through the pores of the coke and the separation of the water from the compressed-air ceases as soon as these pores are completely charged with water. Now, since the water does not leave the coke again voluntarily it follows that the compressed air on leaving said device will contain exactly the same amount of moisture as it contained on entering it.

Fractured or broken bricks or sandstone do not give any better results than coke, for these materials get rotten in a comparatively short space of time and then the pieces torn off by the compressed-air standing under pressures of from 75 to 130 lbs. will form a constant source of danger to the machines or tools operated by the compressed-air thus treated.

Pebbles, i. e. quartz, when utilized in their natural state, likewise do not give satisfactory results, since then the compressed-air simply slides or passes over their smooth and convex surfaces and for this reason leaves the device again in about the same moist condition in which it previously entered it. The condition to be fulfilled therefore is, that the compressed-air is led over hard and sharp edges and rough surfaces.

Figure 6:
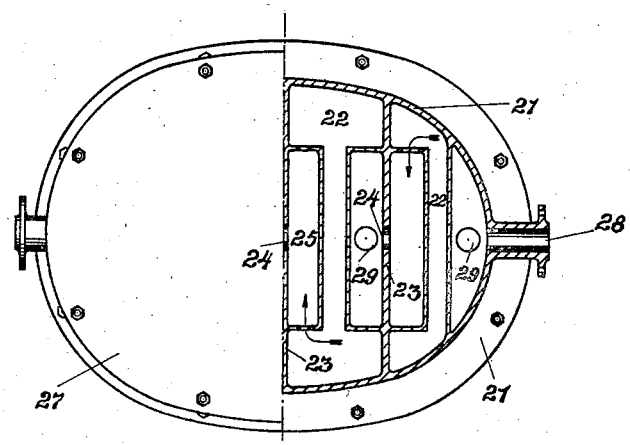
Figure 6 is a plan-view of this modification partly in section taken on line G—H of Figure 5.

The modification of my invention shown in Figures 5 and 6 offers the important advantage that the water does not need to flow from chamber-bottom to chamber-bottom, whereby it would run the risk of being at least partially absorbed again by the compressed air. To avoid this, all separation-chambers are arranged vertically and directly over a common collecting-chamber with which each separation-chamber is in direct connection by a drain-pipe.

This modification of my invention consists of a casing 21 subdivided into a plurality of separation-chambers 22 by vertical partition-walls 23. These separation-chambers are likewise arranged in series and are connected with each other by apertures 24 in the upper portions of said partition-walls. Air-compartments 25 are provided partly on the walls of said casing and partly on said partition-walls in order to automatically aid the moist compressed-air in changing its direction while passing from one separation-chamber to another. The packing 26 of fractured quartz will preferably reach at least high enough to cover the openings 30 mentioned below, or it may fill said chambers up to the cover 27, if so desired.

The operation of this modification is as follows:—

The compressed-air enters the first-air-compartment 25 with great velocity by way of the inlet-pipe 28 and is directed downward to pass through the bottom-opening 29 into the first terminal chamber of the series of chambers 22, whereby it rushes into the interstices of the quartz-packing 26 contained therein. In these interstices an energetic whirl is created by the compressed-air with the result that the stream of compressed-air flows off in an upward direction and enters the second air-compartment 25 through a side-opening 30 at the lower portion thereof. From this compartment the compressed-air passes through the aperture 24 of the first partition-wall 23 into the third air-compartment 25. Herein the direction of the compressed-air is turned downward again and the latter leaves this air-compartment through a bottom-opening 29 to enter the next separation-chamber 22, into which the compressed-air enters with a considerable velocity and after creating an energetic whirl in the interstices of the quartz-packing 26 disposed therein, ascends again to enter the next air-compartment 25 through its side-opening 30. The operations described above are repeated in regard to each separation-chamber 22 until the dried compressed-air finally leaves the device by way of the second terminal chamber of the series of chambers 22 and the discharge-pipe 31.

In this modification the same actions take place as in the device illustrated in Figures 1 to 4 inclusive, to remove every trace of moisture or water from the compressed-air in motion. This action will, of course, be all the more effective when the compressed-air is not simply led as a smoothly flowing stream over the fractured surfaces of the quartz-packing, but when it strikes against these surfaces with all its force. Even this last-named action may be rendered more effective still by compelling the compressed-air to create whirls in the interstices of the quartz-packing, as is actually the case in the modification of my invention illustrated in Figures 5 and 6.

In this construction, the separated water does not any more flow from chamber to chamber, but trickles from the upper portion of the quartz-packing downward to the slanting chamber-bottoms, whence the water will be separately directed by drain-pipes 32 into a common collecting-chamber 33 to be finally led off through a pipe 34 to the open air by the aid of a float operated valve 35—or a similarly operated device—to prevent the flooding of the device. A mixing of the separated water with the outward-flowing compressed-air can therefore not take place under any circumstances.

I claim:—

1. A device for separating water from compressed-air in motion comprising a casing, means for introducing the moist compressed-air into said casing, a packing consisting of a mass of particles of sharp-edged practically non-porous material contained in said casing, such material being practically impervious to air adapted to separate the water from said inflowing moist compressed-air, means for leading off the dried compressed-air, and a collecting-chamber for said separated water.

2. A device for separating water from compressed-air in motion, comprising a casing, a plurality of separation-chambers arranged in said casing in series and communicating one with another, means for introducing the moist compressed-air into said separation-chambers, a packing of sharp-edged practically non-porous fractured material contained in said separation-chambers, said material being practically impervious to air and adapted to separate the water from said inflowing moist compressed-air while passing through said packing, means for leading off the dried compressed-air, and a collecting-chamber arranged below said separation-chambers for receiving the separated water.

3. A device for separating water from compressed-air in motion, comprising a casing, apertured partition-walls in said casing, a plurality of separation-chambers arranged in said casing in series and communicating with each other through the apertures of said partition-walls, an inlet for introducing the moist compressed-air into said separation-chambers, a packing of fractured quartz in each of said separation-chambers and adapted to separate the water from said moist compressed-air while passing through said casing, an outlet for leading-off the dried compressed-air and arranged to compel the latter to pass through said separation-chambers in succession, an apertured-bottom in each of said separation-chambers, and a collecting-chamber arranged beneath said apertured chamber-bottoms to receive the separated water.

4. A device for separating water from compressed-air in motion, comprising a casing, apertured partition-walls subdividing said casing, a plurality of separation-chambers formed by said partition-walls and connected in series, an apertured slanting bottom in each of said separation-chambers, an inlet-pipe for introducing the moist compressed-air into the one terminal-chamber of said series of separation-chambers, a packing contained in each of said separation-chambers and consisting of fractured quartz, an outlet-pipe for conducting away the dried compressed-air from the other terminal-chamber of said series of separation-chambers, and a collecting-chamber arranged beneath said separation-chambers to receive the separated water draining-off through said apertured slanting chamber-bottoms.

5. A device for separating water from compressed-air in motion, comprising a casing, apertured partition-walls subdividing said casing, separation-chambers formed by said partition-walls and arranged in series, removable means for opening and hermetically closing again said separation-chambers, an apertured slanting bottom in each of said separation-chambers, an inlet-pipe for introducing the moist compressed-air into said casing, a sharp edged packing consisting of fractured quartz and contained in said separation-chambers to separate the water from said moist compressed-air, means in said casing for changing the direction of motion of said compressed-air while passing from one of said separation-chambers to another, means for leading-off the dried compressed-air, and a collecting-chamber for the reception of the water separated from said moist compressed-air.

6. A device for separating water from compressed air, comprising a casing with a chamber forming a passage through which the compressed air is adapted to travel, and a packing consisting of a mass of particles of sharp-edged practically non-porous material in said chamber said material being practically impervious to air and thus adapted to eliminate water from moist air impinging on said material.

7. A device for separating water from compressed air, comprising a casing with a chamber for the passage of the compressed air, and a packing of broken quartz in said chamber.

8. The process of separating water from compressed air, which consists in causing moist compressed air to come in contact with a mass of particles of sharp-edged practically non-porous material, to throw down the moisture, and collecting said moisture while the air from which the water has thus been eliminated is carried away from such water.

9. The process of separating water from compressed air, which consists in bringing moist compressed air in contact with a mass of broken quartz, to isolate the moisture, and collecting said moisture while the air from which the water has thus been eliminated is carried away from such water.

10. A device of the character described, comprising a plurality of separation chambers connected in series, the first of such chambers having an inlet for the fluid to be treated, and the last of said chambers having an outlet for the purified fluid, said chambers having inclined bottom walls to facilitate the discharge of liquid eliminated from the fluid under treatment.

11. A device of the character described, comprising a plurality of separation chambers connected in series, the first of such chambers having an inlet for the fluid to be treated, and the last of said chambers having an outlet for the purified fluid, said chambers having bottom walls provided with apertures for the discharge of liquid eliminated from the fluid under treatment, said bottom walls being inclined downwardly toward said discharge apertures.

Signed by me at Dortmund, Germany, this 3. day of December, 1920.

RICHARD POTH.

Witnesses:
ARTHUR NISSEL,
WILHELM WOLFF.